United States Patent [19]
Ramthun

[11] Patent Number: 6,008,556
[45] Date of Patent: Dec. 28, 1999

[54] SEAL DEVICE FOR ISOLATING BEARING ASSEMBLIES IN A MOTOR

[75] Inventor: Dennis C. Ramthun, Tomahawk, Wis.

[73] Assignee: Packaging Corporation of America, Lake Forest, Ill.

[21] Appl. No.: 08/434,278

[22] Filed: May 3, 1995

[51] Int. Cl.⁶ .................................................. H02K 5/167
[52] U.S. Cl. .......................... 310/88; 277/135; 384/487
[58] Field of Search .............................. 310/88; 277/135; 384/481, 482, 484, 485, 486, 487, 488, 489; 285/276, 281

[56] References Cited

U.S. PATENT DOCUMENTS

| | | | |
|---|---|---|---|
| 1,158,106 | 10/1915 | Clark | 384/487 |
| 1,325,996 | 12/1919 | Rolland | 277/135 |
| 1,803,625 | 5/1931 | Larson | 384/487 |
| 1,930,586 | 10/1933 | Delavel-Crow | 384/487 |
| 2,803,764 | 8/1957 | Lundscow | 310/93 |
| 3,486,051 | 12/1969 | Hanson | 310/91 |
| 3,679,277 | 7/1972 | Dohmen | 310/90 |
| 3,771,911 | 11/1973 | Turci | 417/413 |
| 3,798,925 | 3/1974 | Martus | 464/153 |
| 4,010,960 | 3/1977 | Martin | 277/3 |
| 4,113,328 | 9/1978 | Vander Meulen | 308/187.1 |
| 4,142,608 | 3/1979 | Sarle | 184/6.11 |
| 4,733,978 | 3/1988 | Colanzi et al. | 384/482 |
| 4,746,828 | 5/1988 | Nado et al. | 310/90 |
| 5,153,470 | 10/1992 | Miyaji et al. | 310/67 R |
| 5,230,520 | 7/1993 | Dietle et al. | 277/134 |

FOREIGN PATENT DOCUMENTS

| | | | |
|---|---|---|---|
| 1209190 | 8/1986 | Canada | 310/132 |
| 0 111 366 A1 | 6/1984 | European Pat. Off. | H01R 39/06 |
| 0 131 080 A1 | 1/1985 | European Pat. Off. | B08B 3/12 |
| 0 255 222 A1 | 2/1988 | European Pat. Off. | H02K 5/167 |
| 31 31 148 A1 | 2/1983 | Germany | H02K 5/167 |
| 31 31 149 A1 | 2/1983 | Germany | H02K 5/167 |
| 41 22 220 A1 | 1/1992 | Germany | H02K 5/124 |
| 57-3547 | 1/1982 | Japan | 310/88 |
| 60-139149 | 7/1985 | Japan | 310/88 |
| 60-229646 | 11/1985 | Japan | 310/88 |
| 1334282 | 8/1987 | U.S.S.R. | 310/88 |
| 1457078 | 2/1989 | U.S.S.R. | 310/88 |

OTHER PUBLICATIONS

Chapter Fourteen of Fundamentals of Machine Component Design by Robert C. Juvinall, pp. 427–456, Copyright 1983.
ASEA Pamphlet OK 00–108 E Ed. 3, 12 Pages, date unknown.

*Primary Examiner*—Nestor Ramirez
*Assistant Examiner*—Burton S. Mullins
*Attorney, Agent, or Firm*—Arnold, White & Durkee

[57] ABSTRACT

This invention is directed to a seal device for an energy conversion device which has a rotating shaft supported by bearing assemblies containing lubrication. The seal device inhibits migration of the lubrication from a first portion of the shaft near the bearing assembly to a second portion of the shaft near electronic circuitry. The seal device includes a seal mounting structure which separates the first portion of the shaft from the second portion of the shaft. The seal mounting structure has a shaft receiving surface through which the shaft is placed. A groove is located in the shaft receiving surface and a seal is secured in the groove by various means and remains stationary with respect to the rotating shaft. The seal has an inner segment that surrounds the periphery of the shaft.

47 Claims, 7 Drawing Sheets

SEAL DEVICE FOR ISOLATING BEARING ASSEMBLIES IN A MOTOR

FIELD OF THE INVENTION

The present invention relates generally to a motor. More particularly, the present invention relates to a seal device for minimizing the loss of bearing lubrication and inhibiting migration of lubrication from the bearing assemblies into the motor cavity encasing electronic circuitry thereby reducing the risk of electrical shorts and increasing the time between periodic maintenance.

BACKGROUND OF THE INVENTION

AC and DC electrical motors convert electrical energy into mechanical energy by utilizing the electromagnetic force produced by current carrying conductors within an electromagnetic circuit. This mechanical energy is typically in the form of a shaft undergoing rotation due to a changing electromagnetic field within the motor. The electromagnetic field change is caused by current variations in the electromagnetic circuit which is a function of the angular position of the shaft. The electromagnetic field incrementally changes its magnitude around the shaft inducing continuous rotation of the shaft.

To accomplish a change in current within the electromagnetic circuit, many electrical motors use a series of brushes to make electrical contact between components of the electromagnetic circuit located on the rotating shaft and other components which are stationary. The rotating commutator slides across the brushes providing an electrical connection between the rotating and stationary electronic components.

Generally, the brushes are made of carbon or a metallic material. Throughout the life of the motor, the repeated contact of the brushes causes wearing of the brushes and a release of brush particulates into the encapsulated environment within the motor housing. Build up of these electrically conductive particulates on the components of the electromagnetic circuit can cause an electrical short. Once an electrical short occurs, the efficiency of the motor degrades until the point in which it must undergo maintenance to clean and replace components within the motor. Additionally, the buildup can cause "arcing" of current within the motor which can be dangerous if the motor is used in a potentially explosive environment, such as a coal mine. And, large releases of current within the motor also present a safety hazard to individuals near the motor.

Fans are often placed near these motors to push air through openings in the motor housing to cool the motor and force the particulates from the motor housing. However, fans by themselves cannot solve the particulate problem because of an additional compound, lubrication, found in the encapsulated environment within the motor. Because the shafts rotate at thousands of revolutions per minute, various types of bearing assemblies containing lubrication are used to mount the shafts. Lubrication is exposed to the shaft and the air around the shaft since the bearing elements contact the shaft. The solid lubrication migrates along the shaft from the bearing assembly and is thrown from the rotating shaft. When the lubricant is released into the air, it settles on the electronic circuitry as the particulates do. The air movement by the fans cannot keep the particulates from "sticking" to the circuitry due to the mixture of lubrication and brush particulates. Not only can the particulate and lubricant mixture cause an electrical short due to the conductivity of the particulates, but the nonconductive lubricant can inhibit the electrical connection between the brushes and the rotating commutator.

In addition to the solid lubricant released into the environment surrounding the electronic circuitry, the drastic temperature rise during operation causes an increased outgassing of lubricant vapor from the solid lubricant. The liberated lubricant vapor then condenses back onto the colder surfaces within the housing. This process results in deposits of lubrication and brush particulates on all surfaces within the housing including the electronic circuit components.

Another problem with the motor occurs during bearing failure when the shaft cuts into the bearing cap and enlarges the through-hole through which the shaft passes. Thus, the minimal tolerance, usually about ⅟₃₂", between the outer periphery of the shaft and the through-hole can be greatly expanded to over ⅜". The expanded gap causes increased leakage of the lubricant from the bearings which results in a quicker failure of the bearings. Additionally, the particulates from the brushes can easily migrate into the bearing assembly through the expanded gap and lessen the effectiveness of the bearing assembly.

Considering that many of the motors are very large and weigh several thousand pounds, it can take several hours to access the surfaces coated with the lubricant and particulate mixture, clean those surfaces, and reassemble the motor. A vapor degreasing process is typically employed using various solvents such as trichloroethylene which releases hazardous vapors into the air. If the problem is not regularly addressed through periodic maintenance which is generally required every one to three months depending on the motor, then current arcing between the components damages the electromagnetic circuit. If the motor must be cleaned and the damaged components replaced, the motor "downtime" can last several days. Any "downtime" in the motor causes a downstream stoppage in the processes which rely upon the mechanical energy produced by the motor. In addition to the financial loss due to "downtime", the replacement of components and the man-hours necessary to perform repairs and maintenance is very costly.

As stated, the mere movement of air through the housing does not entirely alleviate the particulate build-up due to the presence of the lubricant. Throughout the motor industry, no attempt to isolate the lubricated bearings from the housing cavity has been successful. To accomplish this long felt need to eliminate the problems associated with the lubricant-particulate mixture and increase efficiency, many manufacturers have developed efficient "brushless" motors which utilize a series of electronic switches that open and close based on the angular position of the shaft which changes the current within the electromagnetic circuitry. Thus, with the removal of the brushes, no particulates are released. However, motors employing brushes continue to be produced. And, due to the high cost of new motors, the hundreds of thousands of existing brush electric motors continue to be used in every industry.

Additionally, attempts to retrofit existing motors by affixing a seal to the rotating shaft have been made, but have failed. The extreme vibration of the shaft loosens the seal and the means by which the seal is fastened to the shaft which ultimately leads to leakage of the lubricant into the housing cavity. In another retrofit attempt, a plastic seal fastened to a plate mounted on an inboard wall of the bearing assembly was utilized. Again, the vibration proved too much for the plastic seal.

SUMMARY OF THE INVENTION

Briefly, the present invention is directed to a new and improved seal device, as well as a method for retrofitting existing motors with the seal device. The seal device is affixed in a U-shaped groove machined into a cylindrical surface defining a hole through which the shaft is placed. The seal device remains stationary with respect to the rotating shaft and acts as a lubrication barrier. This seal device and retrofitting methodology will save owners of electric motors much time and money in the upkeep of these motors.

An inner cylindrically-shaped portion of the seal device has a diameter approximately the same as the outer diameter of the shaft. The inner portion of the seal device remains in contact with the shaft as it rotates thereby inhibiting migration of the solid lubricant and lubricant vapor from the bearing assembly into a housing cavity containing the electromagnetic circuit. Alternatively, the seal device surrounds the rotating shaft and remains in close proximity to the shaft without contacting the seal. The seal device can be made of various materials which have a low permeability to the lubricant vapor and a minimal abrasive effect on the shaft such as plastics and rubbers. The seal device can also be constructed from multiple materials such as a metal seal with a rubber collar surrounding the shaft.

As an alternative to the U-shaped groove, an L-shaped end notch is cut into the same cylindrical surface containing the groove, except the end notch is located on an inboard or outboard surface intersecting the cylindrical surface. The seal is then fit into the end notch at the inboard or outboard surface such that a side of the seal is exposed. If the seal requires additional securing means, a plate having a cylindrical hole through which the shaft is placed is positioned against the seal and mounted to the inboard or outboard surface.

In one embodiment, the seal device is press-fit into the end notch or groove. The frictional force between the outer surfaces of the seal device and the surface defining the end notch or groove adequately prevents rotation of the seal device with the shaft. Additionally, the press-fit contact can be further enhanced by introducing an adhesive to the contacting surfaces of the seal device and the end notch or groove.

In another embodiment, the seal device is held stationary with a plurality of fasteners. A plurality of holes extend in the radial direction with respect to the shaft from the groove or end notch to an exterior surface. The fasteners are disposed in these holes and hold the seal device stationary. Additionally, the fasteners can serve the purpose of accurately positioning the seal device around the shaft in the unexposed groove or notch.

The method of retrofitting existing electric motors with the seal device depends on the type of electric motor. First, the housing of the electric motor is removed to expose the shaft and bearing assembly. Then, the shaft is removed from the bearing assembly and a U-shaped groove is machined into a structural surface of the bearing assembly or housing assembly which surrounds the shaft. Alternatively, if the thickness of the structural surface cannot accommodate a U-shaped groove, then an L-shaped end notch is cut on the structural surface at an inboard or outboard surface. A seal device is then placed into the groove or notch and secured via press-fit surface friction, fasteners, adhesive, or other securing means. The shaft is then reinserted through the bearing assembly such that the seal device surrounds the shaft at its periphery. Finally, the housing is reassembled and the motor is ready for operation.

BRIEF DESCRIPTION OF THE DRAWINGS

Other objects and advantages of the invention will become apparent upon reading the following detailed description and upon reference to the drawings in which:

FIG. 8$a$ is a cross-sectional view of a finger seal prior to the insertion of the shaft;

FIG. 8$b$ is a cross-sectional view of a finger seal after the insertion of the shaft.

While the invention is susceptible to various modifications and alternative forms, certain specific embodiments thereof have been shown by way of example in the drawings and will be described in detail. It should be understood, however, that the intention is not to limit the invention to the particular forms described. On the contrary, the intention is to cover all modifications, equivalents, and alternatives falling within the spirit and scope of the invention as defined by the appended claims.

DESCRIPTION OF THE PREFERRED EMBODIMENT

Figure 1:
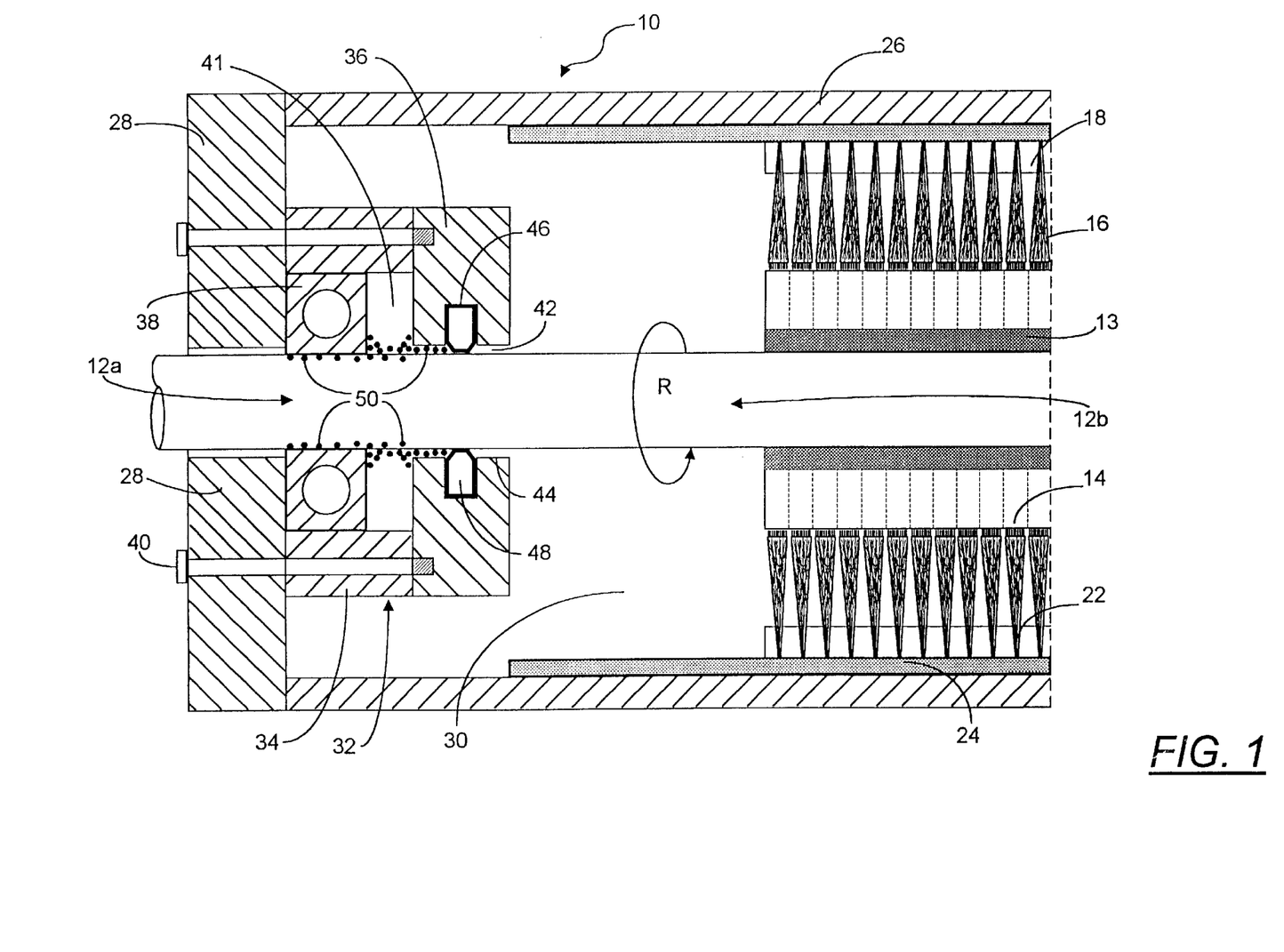
FIG. 1 is a cross-sectional view of a portion of an electric motor showing a seal device in a U-shaped groove in a structure within the bearing assembly.

Referring initially to FIG. 1, a portion of a motor 10 is shown in a cross-sectional view. A shaft 12 is shown extending through the motor 10 and carrying rotating electromagnetic circuitry 13 and a commutator 14. The shaft 12 has a first portion 12$a$ near the mounting location of the shaft 12 and a second portion 12$b$ adjacent the working electromagnetic components. The rotating electromagnetic circuitry 13 electrically communicates with the commutator 14. A plurality of brushes 16 are in contact with the commutator 14 and mounted on an insulative brush mount 18. The insulative brush mount 18 includes electrical leads 22 which communicate electrically with stationary electromagnetic circuitry 24 which like the rotating electromagnetic circuitry 13 is depicted for simplicity as a solid thin structure. Thus, the rotating electromagnetic circuitry 13 is coupled to the stationary electromagnetic circuitry 24 via the brushes 16 and commutator 14. This circuitry provides the changing magnetic field causing the shaft 12 to undergo rotation R when power is applied to the motor 10.

FIG. 1 represents one configuration of many in which a motor having brushes can be designed. However, the configuration variations from motor to motor are immaterial to this invention. Only, the relative position of the seal device to the electromagnetic circuitry and bearing assembly is important.

A housing 26 extends across the motor 10 and attaches to an end bracket 28 at both sides of the motor 10 although only one end bracket 28 is shown. The housing 26 and the end brackets 28 define a cavity 30 in which the working components of the motor 10 reside. In some motors, the end of the shaft 12 may reside completely within the cavity 30 while in other motors, as FIG. 1 depicts, the shaft 12 extends beyond the end bracket 28.

A bearing assembly 32 extends from and is mounted to the end bracket 28. The bearing assembly 32 generally includes a bearing standoff 34, a bearing cap 36, and bearing elements 38. Fasteners 40 pass through the end bracket 28 and the bearing standoff 34 and fasten to the bearing cap 36. The bearing elements 38 are held in place around the first portion 12a of the shaft 12 by the bearing standoffs 34 when the fasteners 40 are tightened. When assembled, the bearing assembly 32 creates an enclosure 41. The bearing cap 36 has a cylindrical hole 42 through which the shaft 12 is placed leaving a slight tolerance between a seal mounting surface 44 and the diameter of the first portion 12a of the shaft 12. As the shaft 12 rotates, the bearing elements 38 support the shaft 12 and reduce the frictional drag on the shaft 12.

An important feature of the invention lies in the stationary seal device which is depicted in FIG. 1 within the bearing assembly 32. A U-shaped groove 46 is cut into the seal mounting surface 44. The groove 46 is positioned in the bearing cap 36 such that adequate material remains on both sides of the groove 46 to ensure the bearing cap 36 remains structurally sound. A seal 48 is then positioned in the groove 46 such that the inner segment of the seal 48 is in contact with the first portion 12a of the shaft 12. The thickness of the seal 48 is approximately the width of the groove 46. As the shaft 12 rotates, the seal 48 remains stationary and prevents any lubrication 50 from migrating from the first portion 12a of the shaft 12 to the second portion 12b of the shaft 12 in the housing cavity 30. Thus, all lubrication 50 remains in the bearing enclosure 41 and is not dispersed onto the stationary electromagnetic circuitry 24 or the rotating electromagnetic circuitry 13. Alternatively, the seal 48 could surround the shaft but not contact the shaft 12. A slight tolerance would exist between the periphery of the first portion 12a of the shaft 12 and the inner segment of the seal 48. This configuration may be advantageous in that no frictional energy loss exists since the shaft 12 and seal 48 are not in contact. Such a non-contacting seal 48 may be a bearing isolator commercially available through many companies such as INPRO Inc. of Rock Island, Ill., or Chesterton Inc. of Stoneham, Mass.

The most basic method in which to secure the seal 48 and prevent its rotation in the groove 46 is by press-fitting the seal 48 into the groove 46. If this method is employed, the seal 48 is made from a resilient material with a thickness slightly larger than the width of the groove 46. The seal 48 is then compressed and placed into the groove 46 where the sides of the seal 48 press against the walls in the groove 46 creating a large frictional force. This frictional force secures the seal 48 in the groove 46 to prevent rotation thereof.

Alternatively, an adhesive is introduced between the groove 46 and the seal 48. The adhesive affixes the seal 48 in the groove 46 after installation of the seal 48. The adhesive is generally placed in the groove 46 or on the seal 48 prior to installation of the seal 48 into the groove 46. This method can also be employed in conjunction with the press-fit securing means described in the preceding paragraph.

Figure 2:
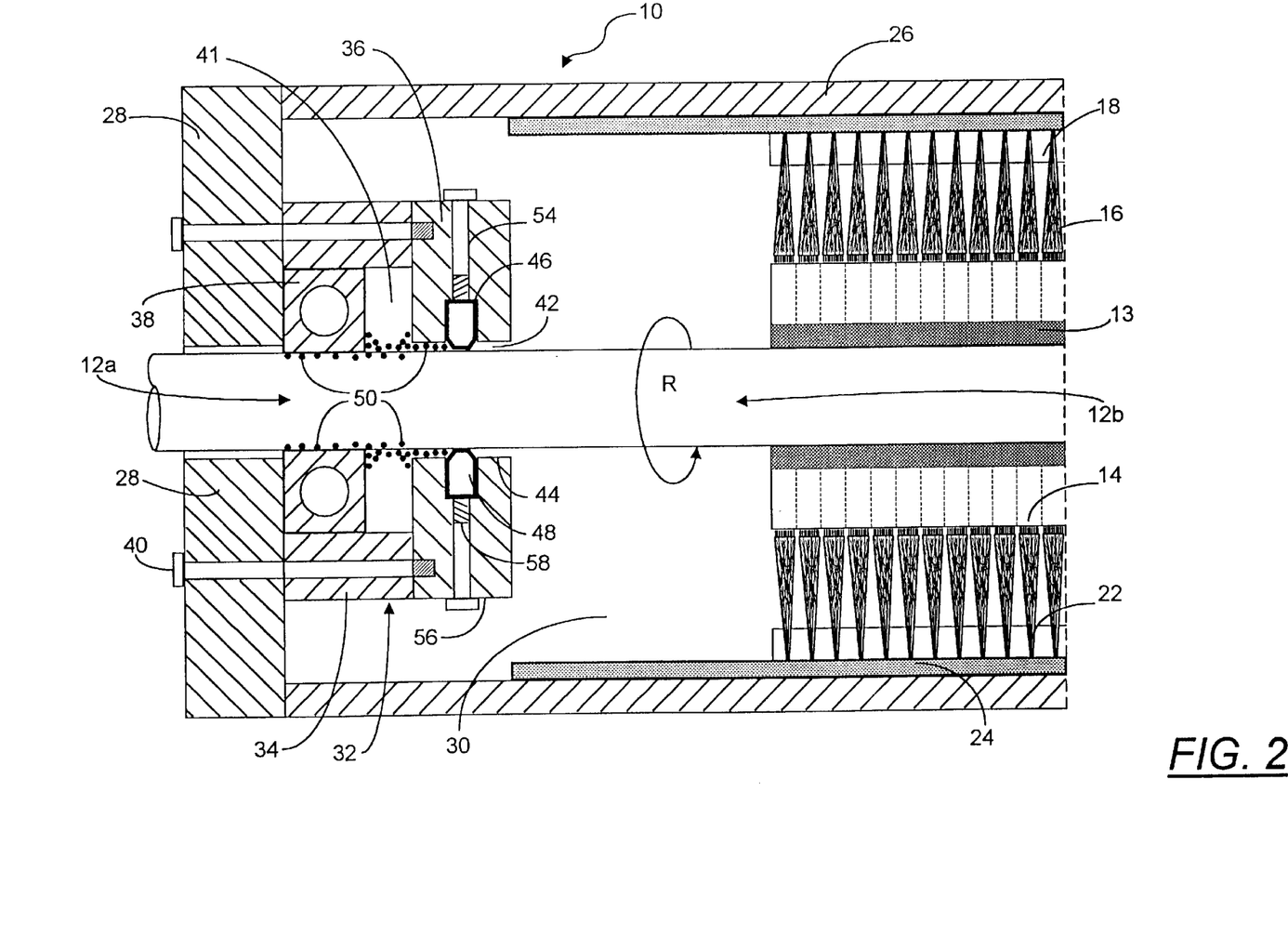
FIG. 2 is a cross-sectional view of a portion of an electric motor showing a seal device in a U-shaped notch in a structure within the bearing assembly with fasteners for extra support.

FIG. 2 is similar to FIG. 1 except the embodiment of FIG. 2 introduces a new method for securing the seal 48. A plurality of holes 54 extends through the bearing cap 36 from an exterior surface 56 into the groove 46. A fastener 58 is then placed into each hole 54 and abuts against the seal 48. The fasteners 58 are tightened from the exterior surface 56 to secure the seal 48 in the groove 46. In one alternative, the fasteners 58 merely exert force against the seal 48 to secure it within the groove 46 and prohibit rotation. In another alternative, the seal 48 has recesses which receive the fasteners 58. This alternative provides more resistance to the tendency of the seal 48 to rotate with the shaft 12.

Figure 3:
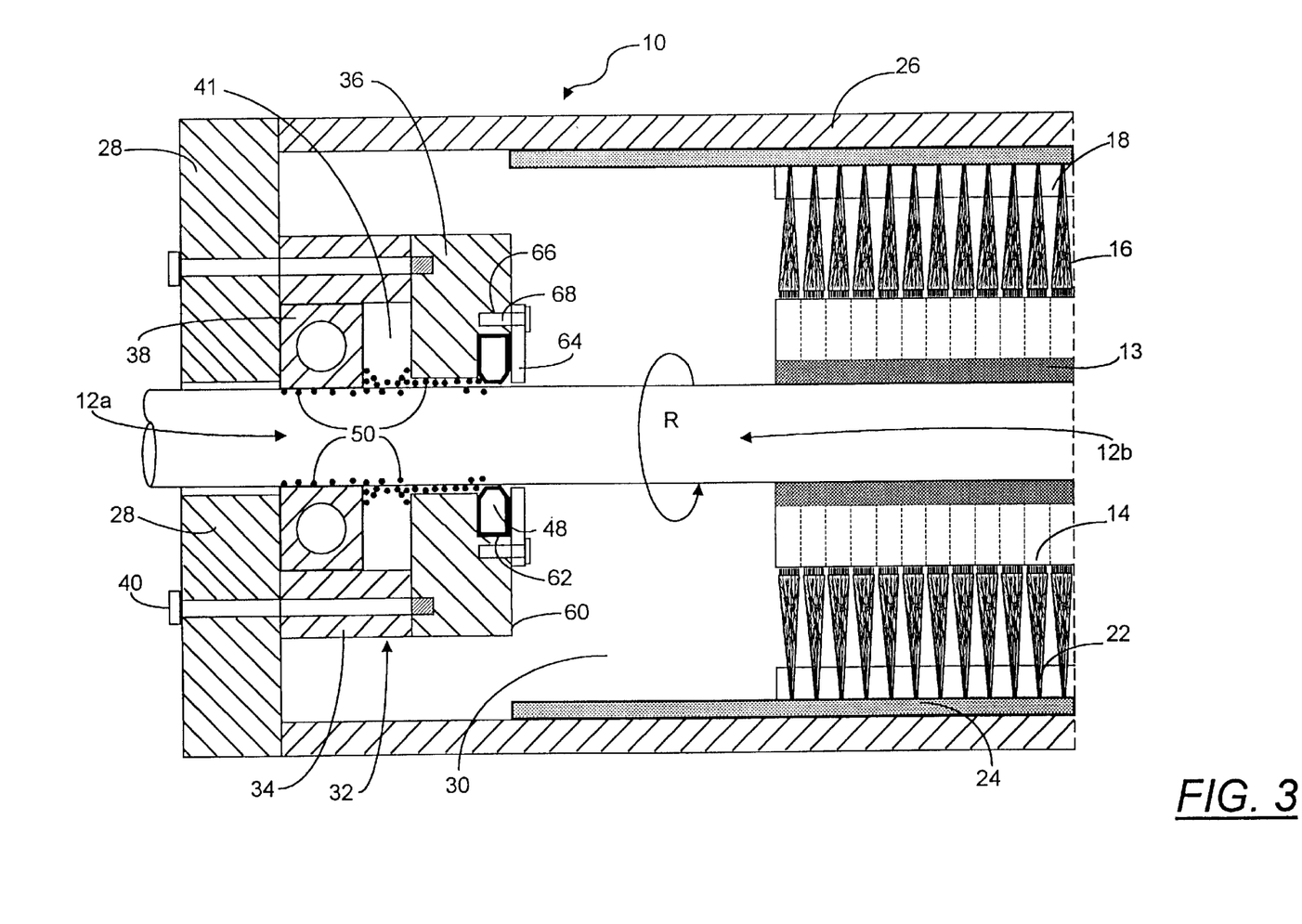
FIG. 3 is a cross-sectional view of a portion of an electric motor showing a seal device in an L-shaped notch in a structure within the bearing assembly at the outboard surface.

FIG. 3 illustrates an embodiment with a different location of the seal 48. Instead of the U-shaped groove 46 of FIGS. 1 and 2, the outboard wall 60 of the bearing cap 36 includes an L-shaped end notch 62. This embodiment is useful if the structure in which the U-shaped groove 46 of FIGS. 1 and 2 is to be placed is not thick enough to accommodate a groove 46. Additionally, access to the seal 48 is much easier. As depicted in FIG. 3, the seal 48 is placed in the end notch 62 and prevents the lubrication 50 from migrating from the first portion 12a of the shaft 12 to the second portion 12b of the shaft 12. Again, the seal 48 can be press-fit into the end notch 62 as the sole means for securing. And, an adhesive can be utilized to further restrain the seal 48 from rotation with the shaft 12.

Alternatively, a plate 64 is placed over the exposed side of the seal 48 to restrict the movement of the seal 48. The plate 64 compresses the seal 48 in an axial direction with respect to the shaft 12 and is fastened to the outboard wall 60. One possible fastening means includes holes 66 machined from the outboard wall 60 into the bearing cap 36 wherein simple plate fasteners 68 such as screws are placed. Other methods to secure the plate 64 to the outboard wall 60 can also be employed.

In addition to the mere compression force exerted by the plate 64 on the seal 48, the plate 64 can include projections at the surface in contact with the seal 48. These projections impinge into the exposed side of the seal 48 and further restrict rotation. Yet another alternative to prohibit rotation of the seal 48 includes additional seal fasteners which extend from the plate 64 into the seal 48 in the axial direction with respect to the shaft 12.

Figure 4:
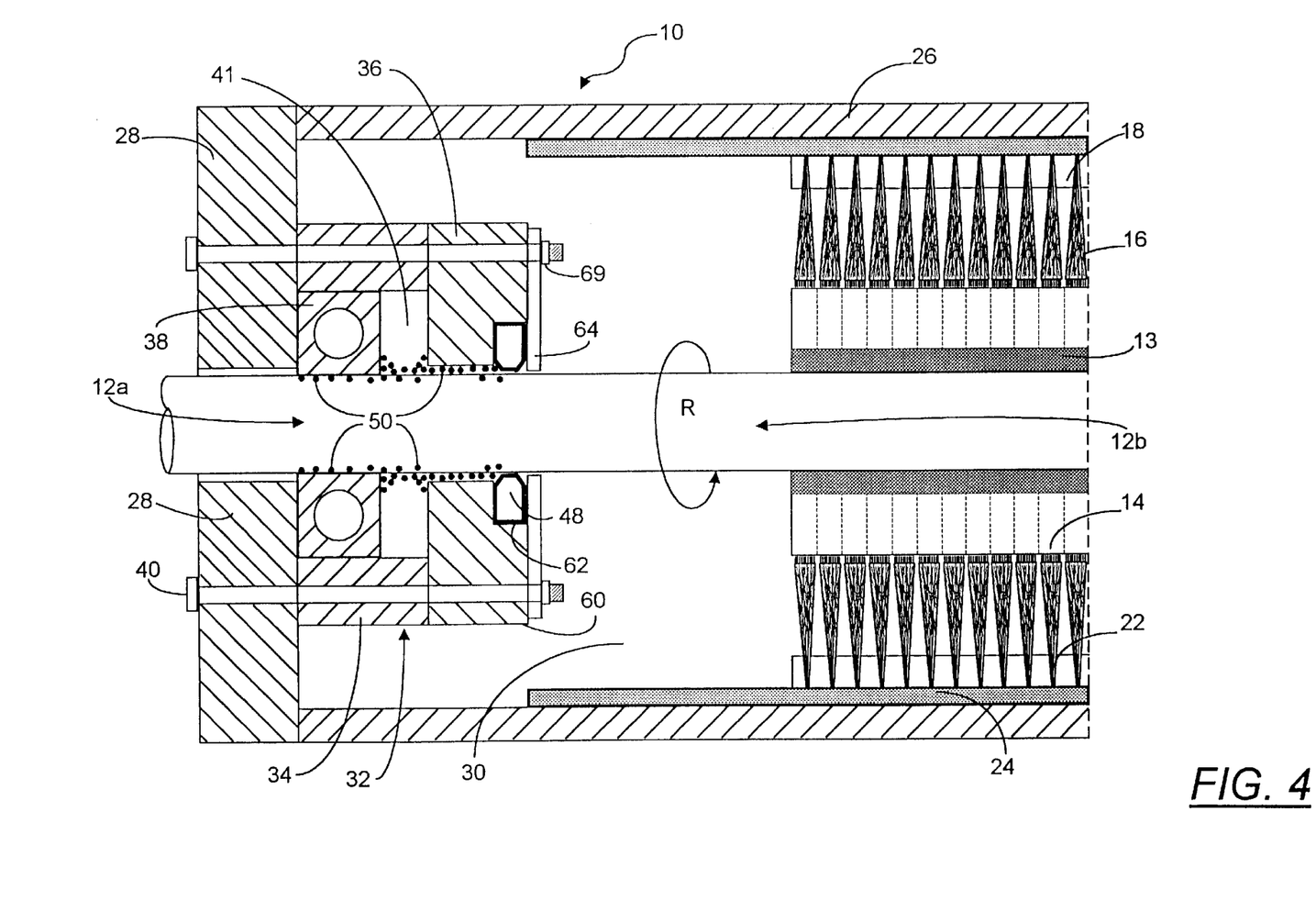
FIG. 4 is a cross-sectional view of a portion of an electric motor showing a seal device in an L-shaped notch in a structure within the bearing assembly at the outboard surface with the bearing assembly fasteners securing the outer plate.

FIG. 4 presents an embodiment similar to that of FIG. 3 except that the fasteners 40 extending through the bearing assembly 32 now serve the purpose of securing the plate 64. The fasteners 40 could tighten into threads in the plate 64. Alternatively, nuts 69 could be placed on the fasteners 40 outside of the plate 64. This embodiment minimizes the possibility the plate 64 will detach since fasteners 40 having nuts 69 are less prone to loosening under shaft vibration in comparison with the plate fasteners 68 of FIG. 3.

Figure 5:
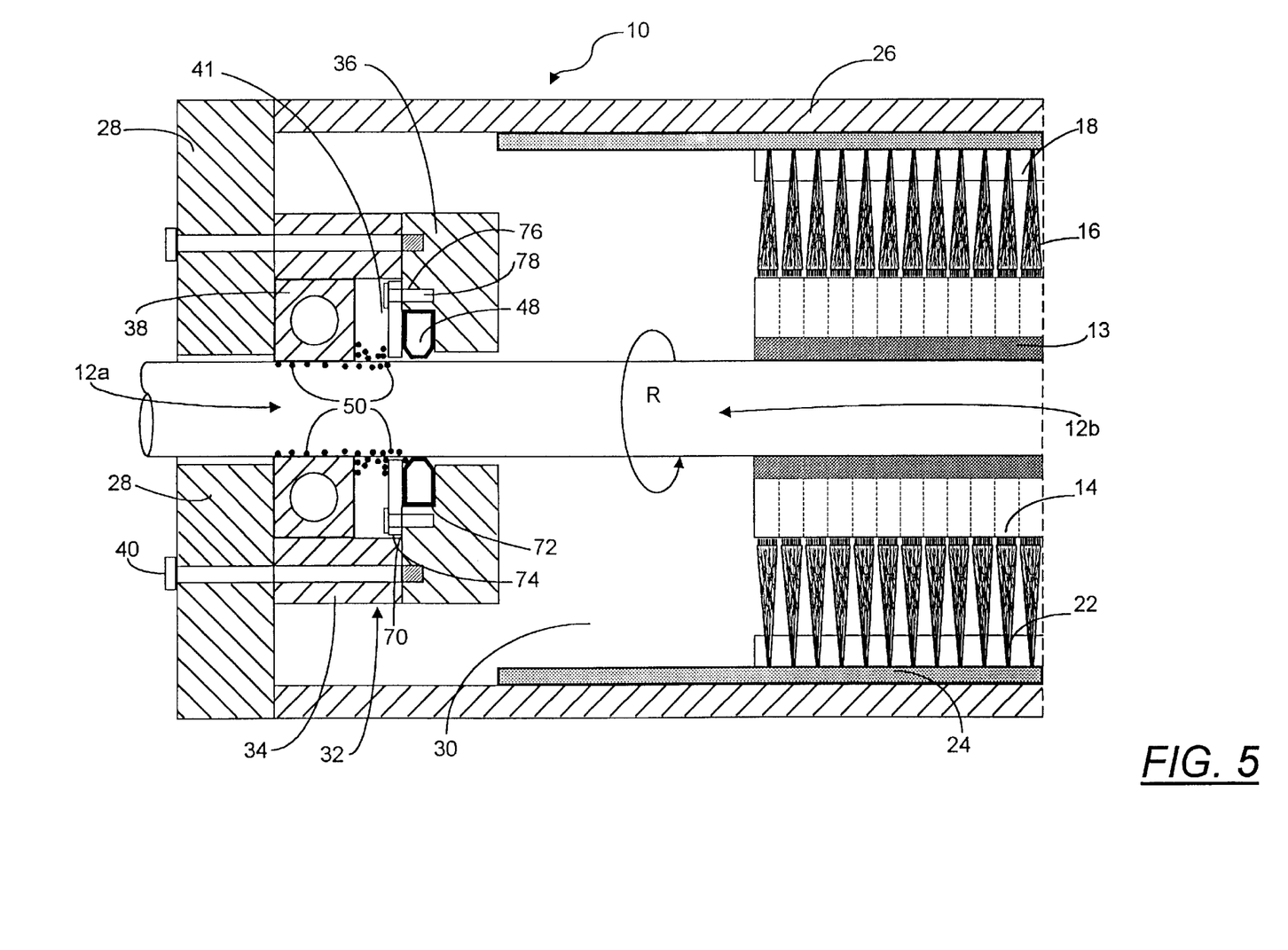
FIG. 5 is a cross-sectional view of a portion of an electric motor showing a seal device in an L-shaped notch in a structure within the bearing assembly at the inboard surface.

FIG. 5 is similar to FIG. 3 except the seal 48 is now located on the inboard wall 70 of the bearing cap 36. An inboard end notch 72 is machined into the bearing cap 36. The seal 48 is placed in the inboard end notch 72 and inhibits migration of the lubrication 50 from the first portion 12a of the shaft 12 to the second portion 12b of the shaft 12. Again, the seal 48 may be designed such that a press-fit securing means in the inboard end notch 72 is enough to restrict rotation of the seal 48. If additional force is desired to hold the seal 48 in place, then an inboard end plate 74 is placed over the exposed side of the seal 48. Holes 76 extend from the inboard wall 70 into the bearing cap 36. The inboard end plate 74 typically is attached to the inboard wall 70 via fasteners 78 which are disposed in the holes 76 in the bearing cap 36. This configuration locating the seal 48 on the inboard wall 70 of the bearing cap 36 may be more advantageous over the configuration locating the seal 48 on the outboard wall 60 as shown in FIG. 3 if spacial constraints exist near the outboard wall 60.

Figure 6:
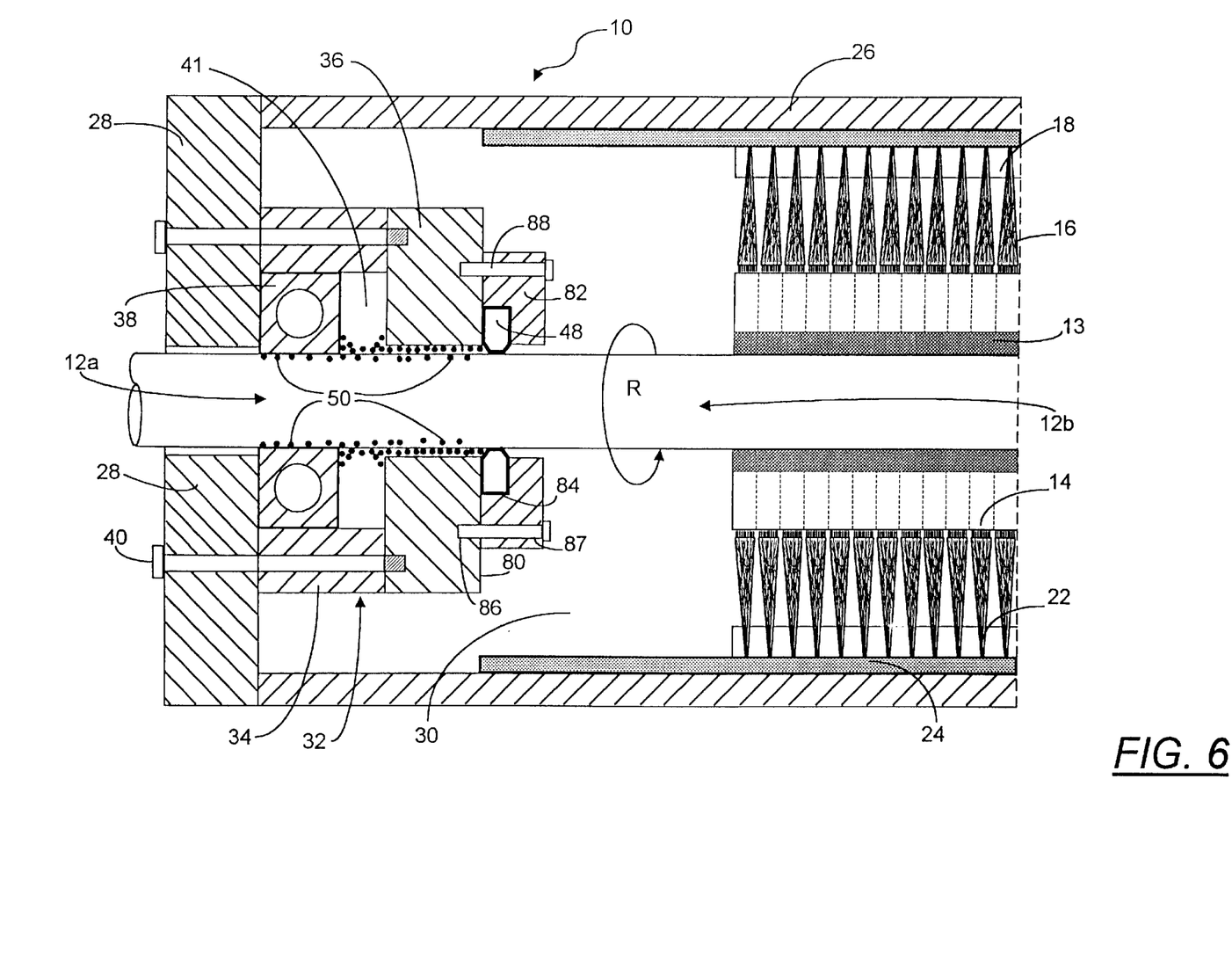
FIG. 6 is a cross-sectional view of a portion of an electric motor showing a seal device in an L-shaped notch of a plate attached to the bearing assembly.

FIG. 6 illustrates yet another alternative which may be more advantageous in retrofitting situations. The bearing cap 36 has neither a groove nor an end notch as in previous configurations. Instead, an outboard wall 80 of the bearing cap 36 functions as a constraint on the seal 48. An end plate 82 having a notch 84 is attached to the outboard wall 80 of the bearing cap 36. The end plate 82 has through-holes 87 through which fasteners 88 are placed. The bearing cap 36 has holes 86 in which the end of the fasteners 88 mate. The seal 48 is placed in the notch 84 and secured in place as the fasteners 88 are tightened. As in the previous configurations, the seal 48 contacts the shaft 12 and remains stationary with respect to the shaft 12. The seal 48 may be secured via a press-fit configuration or an adhesive, or both. The inside portion of the notch 84 in contact with the seal 48 could have projections which impinge on the seal 48 to further secure the seal 48. Another method to restrict rotation of the seal 48 includes additional seal fasteners on the end plate 82 which mate with and secure the seal 48.

In yet a further embodiment, multiple end notches and grooves containing multiple seals are employed. The multiplicity of seals presents a series of barriers which lower the probability of migration of lubrication from the bearing assembly to the electromagnetic circuitry. This multiple barrier seal system may be advantageous for motors having large amounts of lubrication or lubrication which readily permeates the seal material.

It is important to note that FIGS. 1–6 have all shown the seal 48 disposed in or against the bearing cap 36. However, some motors have structural elements within the housing assembly which surround the shaft 12. These structural elements also lie between the bearing assembly 32 near the first portion 12a of the shaft 12 and the electromagnetic circuitry adjacent the second portion 12b of the shaft 12. The seal 48 could easily be placed in such a structure in a configuration similar to those depicted in FIGS. 1–6.

In all configurations, the seal 48 should have a low permeability to lubricant vapor. Additionally, the seal 48 should not be abrasive to the shaft 12 or cause significant drag while the shaft 12 undergoes rotation R. These goals are accomplished by producing the seal 48 from a material such as plastic or rubber. Additionally, many plastics and most rubbers have an excellent resiliency such that a press-fit means for restricting rotation of the seal 48 can be easily accomplished.

Figure 7:
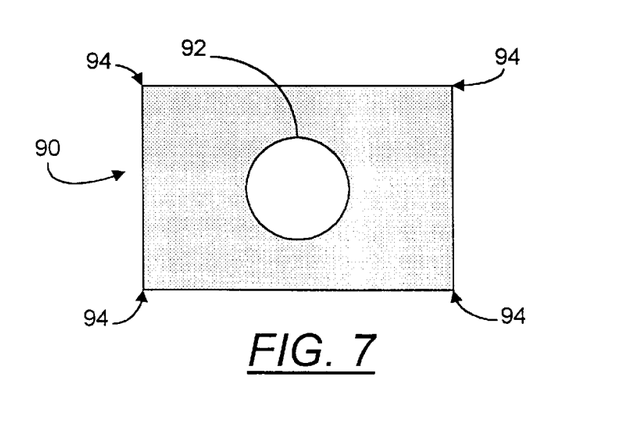
FIG. 7 is plan view of a rectangular-shaped seal.

FIG. 7 is a plan view a rectangular seal 90 with a circular inner segment 92 which surrounds the shaft 12. This shape is advantageous over the typical circular-shaped seal in that the corners 94 of the rectangular seal 90 abut against the structure of the groove or notch in which the rectangular seal 90 is disposed to resist rotation of the rectangular seal 90 with the shaft 12. This rectangular seal 90 can be used in any of the configurations shown in FIGS. 1–6. Alternatively, the outer contour of the seal can have additional sides and be, for example, hexagonal or octagonal to reduce the amount of force that each corner must resist.

Figures 8A, 8B:
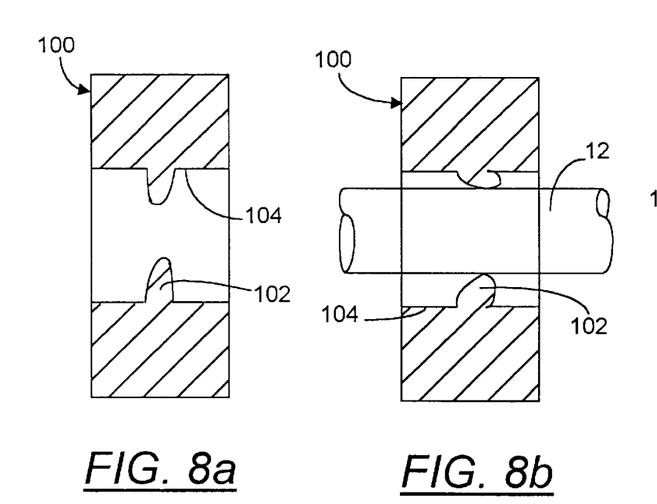

FIGS. 8a and 8b show a cross-sectional view of a specific type of finger seal 100 which can be employed. FIG. 8a illustrates the finger seal 100 without the shaft 12 placed through it. A finger 102 extends inward from an inner cylindrical surface 104. The finger 102 is flexible and forms a tight fit around the shaft 12 as illustrated in FIG. 8b.

Figure 9:
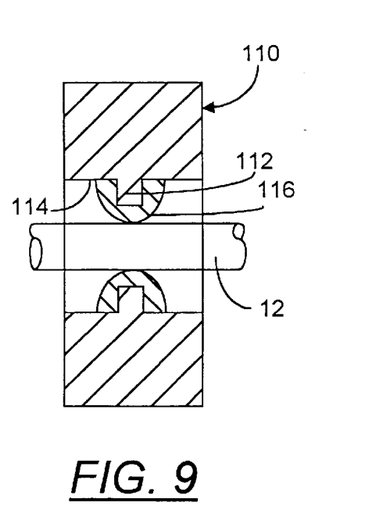
FIG. 9 is a cross-sectional view of a seal which includes a collar in contact with the shaft.

Another approach to the seal configuration is presented in FIG. 9. FIG. 9 illustrates a cross-sectional view of a seal 110 which includes a projection 112 extending inward from an inner cylindrical surface 114. A collar 116 is then placed over the projection 112 and contacts the shaft 12. Because only the collar 116 contacts the shaft 12, it is the only part which should be non-abrasive. Thus, the seal 110 may be made of metal while the collar 116 may be made of a rubber or plastic.

This seal device disclosed is suited for all types of motors in which bearing assemblies support a shaft and lubrication within the bearing assemblies could contaminate the electronic circuitry. Thus, the present invention is useful for stepper motors, pancake motors, and digital motors. Furthermore, the seal device could be incorporated into generators as well. In summary, any energy conversion device having a bearing assembly supporting one portion of a rotating shaft and sensitive electronic circuitry near another portion of the rotating shaft could utilize the seal device to preserve the integrity of the environment surrounding the electronic circuitry.

The invention also includes a method for retrofitting an electric motor with a seal device. First, the housing assembly is disassembled to expose the shaft and the bearing assembly. Second, the shaft is removed from the bearing assembly and freed from other structure surrounding the shaft. Next, a U-shaped groove is machined into a surface which surrounds the shaft. This surface may be on a structure which is part of the bearing assembly or the housing assembly as long as the structure isolates the bearing elements having the lubrication from the electromagnetic circuitry. Additionally, if the structure is not large enough to accommodate a U-shaped groove, then an L-shaped notch can cut into the surface surrounding the shaft at a wall on the structure which is approximately normal to the shaft axis.

Next, a seal is inserted into the groove or notch. The seal can be press-fit into the notch or held by an adhesive introduced to the surface of the seal in contact with the groove or notch. Alternatively, the adhesive can be introduced into the groove or notch before insertion of the seal. In yet another alternative, holes are machined extending from the groove to an exterior surface on the structure. Fasteners are then placed in those holes to exert pressure on the seal and further restrict the seal from rotation.

Next, the shaft is reinserted through the appropriate structure and the bearing assembly where it is mounted. After this reinsertion step, the seal surrounds the periphery of the shaft and depending on the seal, may be in intimate contact with the shaft. Lastly, the housing assembly is reassembled.

If the seal is placed into an L-shaped end notch and the side of the seal is exposed, the seal can be further restrained from rotation by additional steps prior to reinserting the shaft into the surrounding structure and the bearing assembly. First, a plurality of holes are machined into the wall of the structure which intersects the surface surrounding the shaft adjacent the end notch. Next, a plate having an opening through which the shaft is placed is attached to the structure via fasteners secured in the holes. This plate abuts against the exposed side of the seal and restricts movement of the seal. The shaft is then reinserted and the housing assembly reassembled as delineated in the preceding paragraph.

What is claimed is:

1. A seal device for a large, industrial energy conversion device having a rotating cylindrical shaft, electronic circuitry including electrically conductive brushes creating airborne particulates, a housing assembly, and a bearing support assembly for supporting a bearing element, said bearing element containing rolling members and lubricant for reducing the friction on said rolling members, said bearing element being a source of leaking lubricant, said shaft having a first portion rotatably mounted to said bearing support assembly and a second portion adjacent said electronic circuitry, said housing assembly having inner walls defining a housing cavity encasing said electronic circuitry and said bearing support assembly, said electronic circuitry in said housing cavity being surrounded and cooled by air, said seal device comprising:

a seal mounting structure in said housing cavity between said first portion of said shaft and said second portion of said shaft adjacent said brushes where said airborne particulates are produced, said seal mounting structure having a shaft receiving surface defining a hole through which said shaft is disposed;

a groove in said shaft receiving surface, said groove having a width and an outer groove surface defining a groove depth; and     a seal having a thickness and an interior segment surrounding the periphery of said shaft thereby inhibiting migration of said lubricant from said first portion of said shaft to said second portion of said shaft, said seal being secured in said groove and being stationary with respect to said rotating shaft, said seal being spaced away from said source of said leaking lubricant.

2. A seal device as defined in claim 1, wherein said seal mounting structure is spaced from said bearing elements.

3. A seal device as defined in claim 1, wherein said seal mounting structure is attached to said housing assembly.

4. A seal device as defined in claim 1, wherein said seal has a substantially polygonal outer contour and said outer groove surface is substantially polygonal in a cross sectional view in a plane normal to said shaft.

5. A seal device as defined in claim 1, wherein said shaft defines an axial direction that is parallel to said shaft and wherein said width of said groove is slightly less than said thickness of said seal, said seal being press-fit into said groove such that said seal is compressed in said axial direction so as to secure said seal in said groove.

6. A seal device as defined in claim 1, further including an adhesive within said groove to secure said seal in said groove.

7. A seal device as defined in claim 1, further including a plurality of holes in said seal mounting structure extending from said outer groove surface to an exterior surface on said seal mounting structure, said seal device including a fastener in each of said holes abutting said seal to secure said seal in said groove.

8. A seal device as defined in claim 1, wherein said seal is a rubber compound.

9. A seal device as defined in claim 1, wherein said seal is a plastic.

10. A seal device as defined in claim 1, wherein said seal is metal, said seal further including a collar at said interior segment in contact with said shaft.

11. A seal device as defined in claim 1, wherein said seal mounting structure includes an outboard surface adjacent said second portion of said shaft and an inboard surface adjacent said first portion of said shaft, said groove located on said shaft receiving surface at said inboard surface to form a recess at said inboard surface.

12. A seal device as defined in claim 11, further including a plate attached to said inboard surface over said seal thereby prohibiting movement of said seal in a direction towards said first portion of said shaft, said plate having an opening through which said shaft is disposed.

13. A seal device as defined in claim 1, wherein said seal mounting structure includes an outboard surface adjacent said second portion of said shaft and an inboard surface adjacent said first portion of said shaft, said groove located on said shaft receiving surface at said outboard surface to form a recess at said outboard surface.

14. A seal device as defined in claim 13, further including a plate attached to said outboard surface over said seal thereby prohibiting movement of said seal in a direction towards said second portion of said shaft, said plate having an opening through which said shaft is disposed.

15. The seal device of claim 1, wherein said seal contacts said shaft.

16. A housing assembly for a large, air-cooled industrial energy conversion device having a rotating cylindrical shaft and electronic circuitry including electrically conductive brushes creating airborne particulates, said shaft having a mountable first portion and a second portion adjacent said electronic circuitry, said housing assembly comprising:

a bearing support assembly including at least one bearing element, said bearing element containing rolling members and lubricant for reducing the friction on said rolling members, said bearing element being a source of leaking lubricant;

inner walls defining a housing cavity encasing said electronic circuitry and said bearing assembly, said inner walls having openings for delivering air into said housing cavity;

a seal mounting structure in said housing cavity between said first portion of said shaft and said second portion of said shaft adjacent to said electrically conductive brushes, said seal mounting structure having a shaft receiving surface defining a hole through which said shaft is disposed;

a groove in said shaft receiving surface having a width and an outer groove surface defining a depth; and     a seal having a thickness and an interior segment surrounding the periphery of said shaft thereby inhibiting migration of said lubricant from said first portion of said shaft to said second portion of said shaft, said seal being secured in said groove and being stationary with respect to said rotating shaft, said seal being external to said bearing element.

17. A housing assembly as defined in claim 16, wherein said seal mounting structure is spaced from said bearing elements.

18. A housing assembly as defined in claim 16, wherein said seal has a substantially polygonal outer contour and said outer groove surface is substantially polygonal in a cross sectional view in a plane normal to said shaft.

19. A housing assembly as defined in claim 16, wherein said shaft defines an axial direction that is parallel to said shaft and wherein said width of said groove is slightly less than said thickness of said seal, said seal being press-fit into said groove such that said seal is compressed in said axial direction so as to secure said seal in said groove.

20. A housing assembly as defined in claim 16, further including an adhesive within said groove to secure said seal in said groove.

21. A housing assembly as defined in claim 16, further including a plurality of holes in said seal mounting structure extending from said outer groove surface to an exterior surface on said seal mounting structure, said housing assembly including a fastener in each of said holes abutting said seal to secure said seal in said groove.

22. The housing assembly of claim 16, wherein said seal contacts said shaft.

23. A large industrial motor, comprising:

electronic circuitry including electrically conductive brushes creating particulates;

a rotating shaft including a mountable first portion and a second portion adjacent said electronic circuitry;

a bearing support assembly including at least one bearing element for rotatably mounting said shaft at said first portion, said bearing element containing rolling members and lubricant for reducing the friction on said rolling members, said bearing element being a source of leaking lubricant;

a housing assembly having inner walls defining a housing cavity, said housing cavity encasing said electronic circuitry and said bearing assembly;

means for delivering air into said housing cavity;

a seal mounting structure in said housing cavity between said first portion of said shaft and said second portion of said shaft, said seal mounting structure having a shaft receiving surface defining a hole through which said shaft is disposed;

a groove in said shaft receiving surface having a width and an outer groove surface defining a depth; and a seal having a thickness and an interior segment surrounding the periphery of said shaft thereby inhibiting migration of said lubricant from said first portion of said shaft to said second portion of said shaft, said seal being secured in said groove and being stationary with respect to said rotating shaft, said seal being external to said bearing element.

24. An energy conversion device as defined in claim 23, wherein said seal mounting structure is spaced from said bearing elements.

25. An energy conversion device as defined in claim 23, wherein said seal mounting structure is attached to said housing assembly.

26. An energy conversion device as defined in claim 23, wherein said shaft defines an axial direction that is parallel to said shaft and wherein said width of said groove is slightly less than said thickness of said seal, said seal being press-fit into said groove such that said seal is compressed in said axial direction so as to secure said seal in said groove.

27. An energy conversion device as defined in claim 23, further including an adhesive within said groove to secure said seal in said groove.

28. An energy conversion device as defined in claim 23, further including a plurality of holes in said seal mounting structure extending from said outer groove surface to an exterior surface on said seal mounting structure, said housing assembly including a fastener in each of said holes abutting said seal to secure said seal in said groove.

29. The energy conversion device of claim 23, wherein said seal contacts said shaft.

30. A seal device for a large, air-cooled industrial energy conversion device having a rotating cylindrical shaft, electronic circuitry including electrically conductive brushes creating airborne particulates, a housing assembly, and a bearing assembly including a bearing element, said bearing element containing rolling members and lubricant for reducing the friction on said rolling members, said bearing element being a source of leaking lubricant, said shaft having a first portion rotatably mounted to said bearing assembly and a second portion adjacent said electronic circuitry, said housing assembly having inner walls defining a housing cavity encasing said electronic circuitry and said bearing assembly, said electronic circuitry in said housing cavity being surrounded and cooled by air, a seal device comprising:

a seal mounting structure in said housing cavity between said first portion of said shaft and said second portion of said shaft adjacent to said brushes where said airborne particulates are produced, said seal mounting structure having a shaft receiving surface defining a hole through which said shaft is disposed, said seal mounting structure having at least two components; and a seal having a thickness and an interior segment surrounding the periphery of said shaft thereby inhibiting migration of said lubricant from said first portion of said shaft to said second portion of said shaft, said seal being secured between said two components of said seal mounting structure and being stationary with respect to said rotating shaft, said seal being external to said bearing element.

31. A method of retrofitting a large, air-cooled industrial energy conversion device with a seal device, said energy conversion device having a rotating cylindrical shaft, electronic circuitry, a housing assembly, a seal mounting structure, and a bearing support assembly for supporting a bearing element, said bearing element containing rolling members and lubricant for reducing the friction on said rolling members, said shaft having a first portion rotatably mounted to said bearing assembly and a second portion adjacent said electronic circuitry, said housing assembly having inner walls defining a housing cavity encasing said electronic circuitry and said bearing assembly, said seal mounting structure within said housing cavity between said first portion of said shaft and said second portion of said shaft, said seal mounting structure having a shaft receiving surface defining a hole through which said shaft is disposed, said method of retrofitting said energy conversion device with a seal device comprising the steps of:

disassembling said housing assembly to expose said shaft and said bearing assembly;

removing said shaft from said bearing assembly;

making a groove in said shaft receiving surface on said seal mounting structure;

inserting and securing a seal in said groove, said seal having a thickness and an interior segment for receiving said shaft, said seal being made of a material substantially impervious to a vaporous form of said lubricant, said interior segment having a hole approximately the same size as the periphery of said shaft, said seal being external to said bearing element;

placing said shaft through said shaft receiving surface and said interior segment of said seal, said seal inhibiting migration of said vaporous form of said lubricant from said first portion of said shaft to said second portion of said shaft; and reassembling said housing.

32. The method defined in claim 31, wherein said seal mounting structure is spaced from said bearing elements.

33. The method defined in claim 31, wherein said seal mounting structure is attached to said housing assembly.

34. The method defined in claim 31, wherein said step of inserting and securing said seal in said groove includes a step of adding an adhesive to said groove.

35. The method defined in claim 31, wherein said step of inserting and securing said seal in said groove includes the steps of machining a plurality of holes from an exterior surface on said seal mounting structure into said groove, placing a fastener in each of said holes, and tightening said fasteners onto said seal.

36. The method defined in claim 31, wherein said groove is located on a wall of said seal mounting structure generally perpendicular and adjacent to said shaft receiving surface, said seal having an exposed side after insertion into said groove, said step of inserting and securing said seal in said groove includes a step of fastening a plate onto said wall over said exposed side of said seal, said plate having on opening through which said shaft is disposed.

37. The method of claim 31, wherein said electronic circuitry includes electrically conductive brushes and said step of disassembling said housing assembly exposes said brushes.

38. A seal device for use in a large, air-cooled industrial energy conversion device having a rotatable shaft and electronics including electrically conductive brushes that effectuate conversion between electrical energy and mechanical energy, said shaft having a first portion mounted on a bearing component containing a bearing element, said bearing element containing rolling members and lubricant for reducing the friction on said rolling members, said bearing element being a source of leaking lubricant, and a second portion adjacent and exposed to said electronics, said electronics being surrounded and cooled by air, said seal device comprising:

a seal mounting structure disposed between said first and second portion of said shaft thereby isolating said bearing component in a bearing enclosure away from said electronics where airborne particulates are produced, said seal mounting structure having a seal receiving region; and a seal disposed in a non-rotatable fashion within said seal receiving region, said seal having an interior surface at least in close proximity to said rotatable shaft, said seal being made of a material substantially impervious to a vaporous form of said lubricant so that said electronics remain substantially free of said vaporous form of said lubricant, said seal being spaced away from source of leaking lubricant.

39. The seal device of claim 38, wherein said seal mounting structure includes two components, said seal being positioned between said two components.

40. The seal device of claim 38, wherein said interior surface of said seal contacts said rotatable shaft.

41. The seal device of claim 38, wherein said electronics include electrically conductive brushes.

42. A seal device as defined in claim 38, wherein said first surface is an annular surface and said second surface is a cylindrical surface.

43. A method for minimizing the exposure of lubricant vapor and airborne particulates to electronics in a large, air-cooled industrial energy conversion device having a rotatable shaft, said electronics including electrically conductive brushes that create said airborne particulates and effectuate conversion between electrical energy and mechanical energy, said shaft having a first portion mounted on a bearing component containing a bearing element, said bearing element containing rolling members and lubricant for reducing the friction on said rolling members, said bearing element being a source of leaking lubricant which produces said lubricant vapor, and a second portion adjacent and exposed to said electronics, said electronics being surrounded and cooled by air, said method comprising the steps of:

providing a bearing mounting structure on which said bearing component is mounted;

isolating said bearing component from said electronics with a structure except on one portion of said structure where an opening for said shaft is disposed;

providing a seal with an interior segment for surrounding said shaft, said seal being made of a material that is substantially impervious to said lubricant vapor;

installing said seal on said structure adjacent to said opening so that said seal is maintained non-rotationally, said seal being spaced away from said source of leaking lubricant; and inserting said shaft in said opening and through said seal, said first and second portions of said shaft being on opposite sides of said seal, said seal inhibiting said airborne particulates and said lubricant vapor from contacting said electronics.

44. The method of claim 43, wherein said electronics include electrically conductive brushes.

45. The method of claim 43, wherein said structure includes two components in a region where said seal is installed, said seal being positioned between said two components.

46. The method of claim 43, wherein said interior surface of said seal contacts said shaft.

47. A method as defined in claim 43, wherein said first surface is an annular surface and said second surface is a cylindrical surface.

\* \* \* \* \*